United States Patent [19]
Fourny

[11] Patent Number: 4,633,322
[45] Date of Patent: Dec. 30, 1986

[54] SCREEN TO BE DISPOSED IN FRONT OF A CATHODE RAY SCREEN, COMPRISED BY MONOFILAMENTS FORMING MICROMESHES AND HAVING, ON ONE SURFACE, A TRANSLUCENT FILM

[76] Inventor: Denise G. Fourny, 19 Bd de Suisse, Monte Carlo, Monaco

[21] Appl. No.: 701,196

[22] Filed: Feb. 13, 1985

[30] Foreign Application Priority Data

Feb. 20, 1984 [FR] France .............................. 84 02640
Aug. 17, 1984 [FR] France .............................. 84 13004

[51] Int. Cl.⁴ ............................................. H04N 5/72
[52] U.S. Cl. ................................. 358/252; 358/253; 358/254; 358/255; 358/247; 174/35 MS
[58] Field of Search ............... 358/252, 253, 254, 255, 358/245, 247; 174/35 MS; 313/461, 476; 350/276 R, 276 SL

[56] References Cited

U.S. PATENT DOCUMENTS

| 2,943,964 | 7/1960 | Goldenberg | 358/252 |
| 2,977,412 | 3/1961 | Rhodes et al. | 358/252 |
| 4,246,613 | 1/1981 | Choder et al. | 358/253 |
| 4,514,585 | 4/1985 | Paynton | 358/245 |

FOREIGN PATENT DOCUMENTS 706190  3/1954  United Kingdom ............... 350/252

Primary Examiner—James J. Groody
Assistant Examiner—Edward L. Coles
Attorney, Agent, or Firm—Young & Thompson

[57] ABSTRACT

An automatically removable filter is positioned in front of a cathode ray screen, when illuminated, and is comprised by a sheet of textile material woven with micromeshes. An automatic roller is secured to the television set, and the filter is guided and held and secured by its end or by its side. The automatic roller containing the filter is fixed to the television set by its upper or lower part or sides, so that the filter, once it is unrolled, is positioned very closely in front of the screen.

15 Claims, 14 Drawing Figures

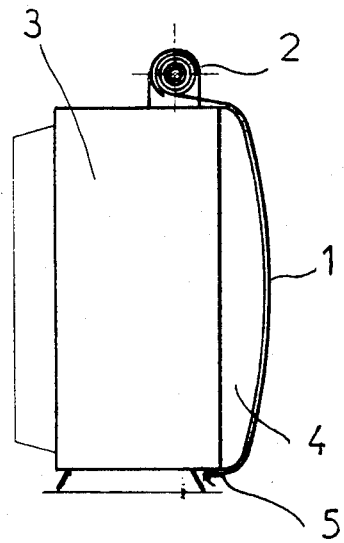
Fig. 3
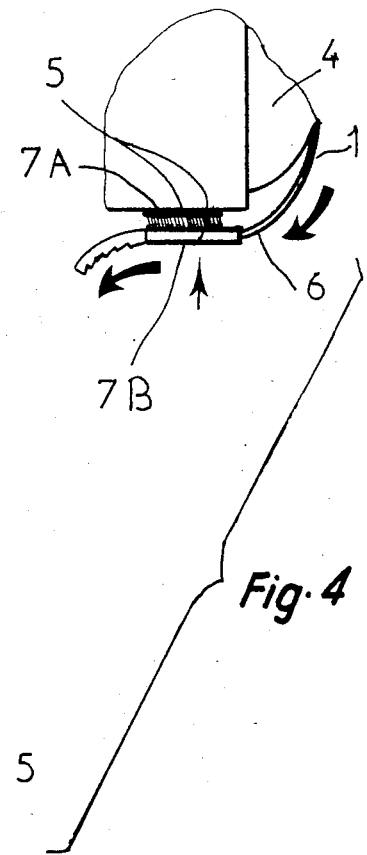
Fig. 4
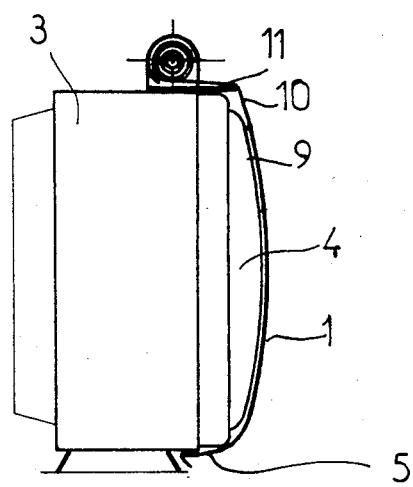

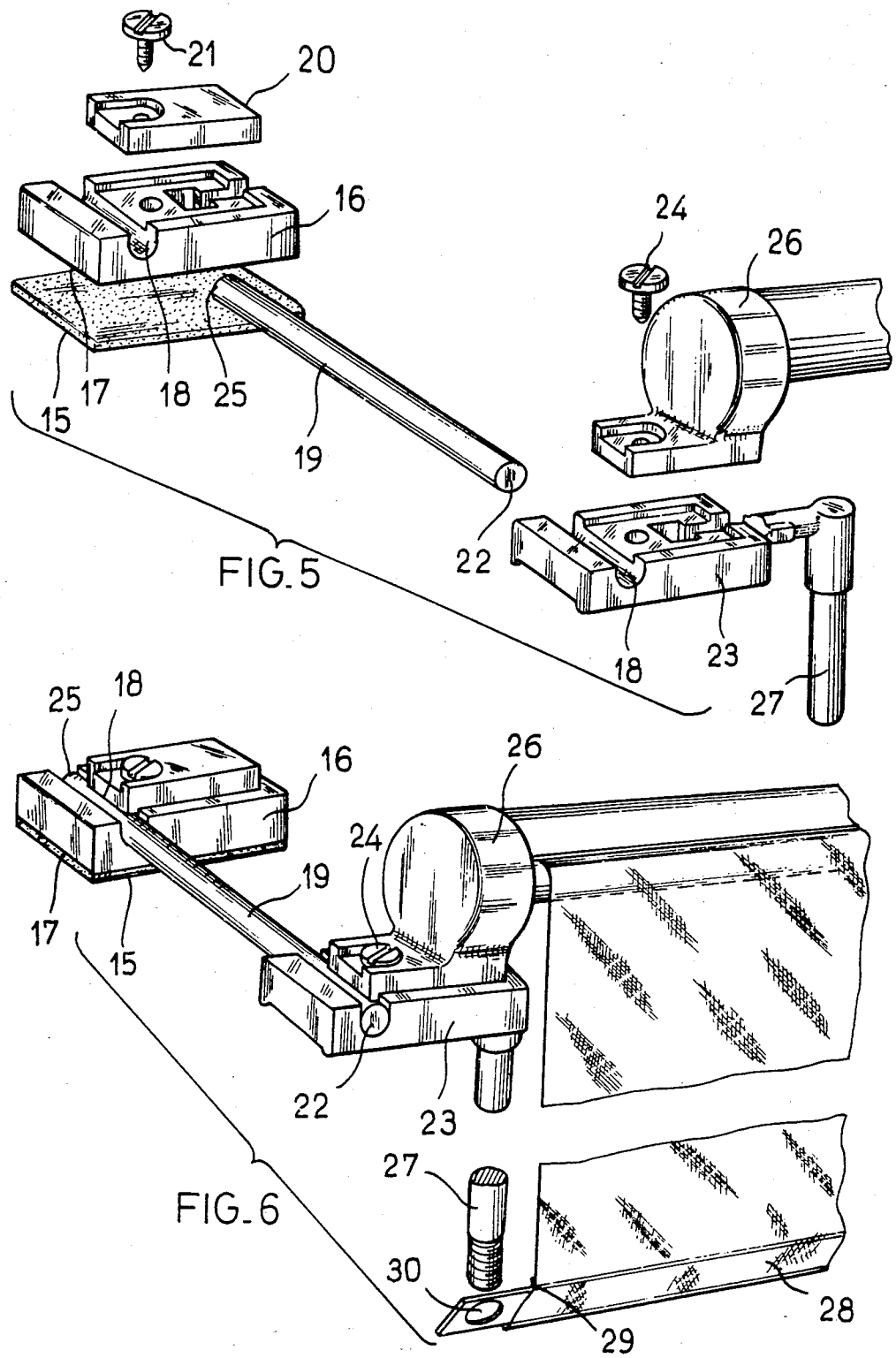

SCREEN TO BE DISPOSED IN FRONT OF A CATHODE RAY SCREEN, COMPRISED BY MONOFILAMENTS FORMING MICROMESHES AND HAVING, ON ONE SURFACE, A TRANSLUCENT FILM

Cathode ray screens are used more and more in businesses or households (microprocessors, television sets, control screens . . . ). These screens have several drawbacks. These drawbacks are as follows:
the underlying linearity of the image,
text vibrations,
reflections of electric lights falling thereon,
the mirror effect in broad daylight,
numerous reflections of different kinds,
the harshness of colors and whites which, whatever the adjustment is, are at least troublesome, sometimes unbearable and cause additional eye strain and fatigue and the like.

Reflections of troublesome lights falling on the screen of a television set have become such a nuisance as were audible disturbances in the early days of "wireless transmission", so much so that one of the large international manufacturers uses in its catalog advertising drawings (not photographs) showing television sets with considerable unnecessary reflection.

The known smooth polarizing filter, of usual material and positioned near the screen, is not effective and causes an independent reflection problem. In fact, such a filter is generally positioned near the iris, whether human (glasses) or non-human (filters for cameras, picture taking . . . ). The distance between the eye and the filter is therefore short and reflections or other "faults" absorbed thereon are virtually non-existent.

It is unthinkable that all the users of cathode ray screens should wear special glasses, which are in addition adapted to their own eyesight, to improve the reception of the image and the text.

It is therefore absolutely necessary that the filter be provided at the source, that is on the screen itself.

The operators and the users of computer terminals who spend long periods of time staring at the screens and reading texts or plans, suffer from the above-mentioned "drawbacks", and they were therefore the first to ask for a solution to overcome this problem.

At present, woven filters with micromeshes, made for example of black polyamide, are currently used. These filters serving as grates or screens are comprised by a frame which maintains taut a panel woven with micromeshes. Said filter is provided with clamping means that allow clamping the same directly in front of the screen.

Even though the filter solves screen-specific problems, it causes problems due to its frame and mounting. The filter is not protected when not in use; with time it accumulates dust particles in its micromeshes, it is necessary to remove the frame to gain access to the screen, for example in order to clean it, the frame as well as the clamping means are rigid, so that it is not always possible that the filter be always at the same distance from the screen, due to the shape of the screen which is not flat but convex.

The prior art can be defined by the following patents: U.S. Pat. No. 2,668,586, GB-A-No. 2 067 380; one of which describes a decorative screen to be positioned in front of the cathode ray screen so as to hide it when not in use, the other patent describes an anti-reflection screen which, being fixed cannot be rolled up. A number of patents describe screens for caravan windows, rigid protection screens for oscilloscopes or image-enlarging screens.

The device according to the invention allows the filter itself to be protected, it facilitates mounting and maintaining said filter and the screen.

The filter is comprised by a sheet of a flexible material such as a panel woven with micromeshes. This sheet of flexible material is disposed in an automatic roller such as those used as protective sunshade screens for cars. Means serving as guides allow the filter to be disposed very close to the screen and to match its shape. Said guide means can be a set of horizontal bars adjustable in height as they are slidably mounted on two vertical bars positioned on opposite sides of the screen.

These vertical bars do not have to be straight, but they can be slightly bent or curved so as to match the curvature of the screen so that the distance between the screen and the filter is as short and uniform as possible.

Means for fastening the roller on the television set are positioned at the level of the shaft of the automatic roller, adjustment means allow adapting the filter to the screen in an optimal manner.

According to another embodiment, the device is comprised by two L-shaped parts. The base of the L comprises a means for securement to the apparatus. This means can be a quick coupling means contacting a quick coupling means secured to said apparatus. The vertical leg of the L, abutting the base of the L, has an opening which allows introducing one of the flanges of the automatic roller corresponding in shape to the opening. The flange of the automatic roller is slidable along the entire length of the vertical leg of the L within a slideway provided for this purpose. A scale graduated in centimeters is provided along this slideway, on the external part thereof, on each surface of one side.

According to another embodiment of the invention, the automatic roller comprising the filter to be positioned in front of the cathode ray screen is joined to the frame of the apparatus.

According to another improvement of the invention, a blocking means allows blocking the rotation of the axle of the automatic roller.

The filter is a sheet made of flexible material. These woven micromeshes filters, for example of black polyamide, having a diameter of about 7/100 mm have generally meshes of about 110 to 125 microns (almost about 8 million for a cathode ray tube 66 cm on the diagonal.

It has proven that for a working surface provided with uniform openings, a smaller weft, for example of 80 microns, is even more effective. Under these conditions, one can only use monofilaments. These monofilaments can be even thinner so as to keep this working surface provided with openings.

This sheet material constituting said filter is delicate and difficult to handle during production.

Accordingly, the inventor has sought to overcome these drawbacks.

The inventor disposed a translucent film against one of the surfaces of the filter. Said translucent film can for example be a film or a sheet made of translucent plastic. This film is slightly translucent, almost transparent.

This plastic film can be rigid, semi-rigid, or flexible, and the micromesh tissue can be welded thereto by rolling in a hot state, calendering or simply fixing thereto by fastening means.

This plastic film has two functions:

(1) A mechanical function,
(2) An optical function.

In this manner, it serves as a correcting means due to its molecular orientation.

It avoids undesired interference fringes (watered effects).

The translucent material appropriately chosen can substantially diminish the polarizing-analyzing effect arising between the cathode ray tube and the screen filter.

The filter is positioned in front of the cathode ray screen, with its surface comprising the translucent plastic film facing the screen and the woven surface without the translucent plastic film positioned towards the user.

The accompanying drawings show as representative but non-limiting examples the preferred embodiments according to the invention; they will allow easy understanding of the invention.

FIG. 3 is a lateral sectional view of the screen and its filter.

FIG. 4 is a lateral view of the screen, its filter and the guiding means for the filter as well as a detailed view of the clamping of the lower portion of the filter by means of quick coupling means.

FIG. 5 is a lateral and exploded view of the components of one end of the automatic roller for the filter.

FIG. 6 is a perspective lateral view of one end of the automatic roller showing clearly the clamping means on the screen and the means for adjusting the distance between the filter and the screen.

Figure 1:
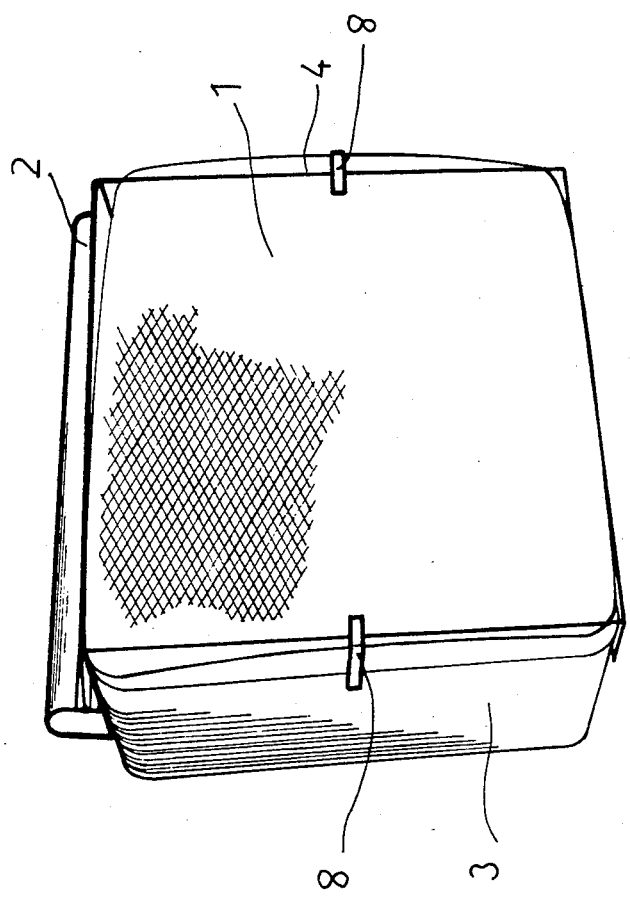
FIG. 1 is a perspective view of the screen and the filter positioned in front of the screen.
Figure 2:
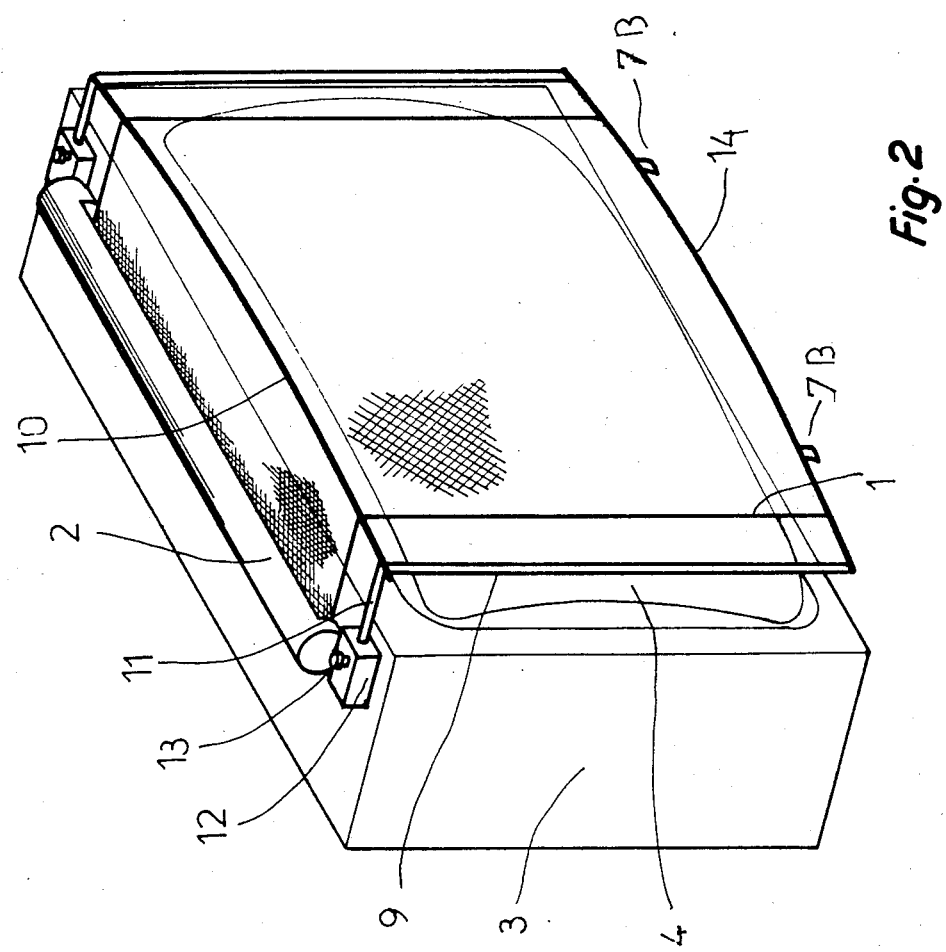
FIG. 2 is also a perspective view of the screen, the filter and the guiding means for the filter.

The filter is disposed in an automatic roller 2 which is mounted on one of the sides of the television set 3 or another device fitted with a cathode ray screen 4. In the embodiment shown in FIG. 1, the filter 1 is unrolled from its roller 2 so as to be positioned in front of the screen 4. Clamping means 5 such as quick coupling means 7A, 7B allow securing the filter 1 by its end 6. For this purpose, pads of hook-and-eye material 7A are attached to the television set 3. The end 6 of the filter 1 is provided with pads of quick connecting hook-and-eye material 7B facing the pads 7A and corresponding thereto. In this manner, the filter 1 can be positioned in front of the screen.

FIG. 1 shows lateral fastening means 8 ensuring a better positioning of the filter 1 in front of the screen. These lateral fastening means can also be quick coupling means.

Of course, the winding device 2, according to the embodiment shown in the Figures, is mounted on top of the television set; one can easily consider mounting the winding device on the bottom or on one of the sides of the television set.

In FIGS. 1, 2, 3, 4, 5, 6 it will be seen that the filter 1 is perfectly positioned with respect to the screen 4, guiding means 9, 11, such as the horizontal bars 11 and the vertical bars 9 allowing adjusting and guiding the position of the filter with respect to the screen 4.

The horizontal bars 11 are fitted in blocks 12 provided for this purpose, which are joined to the roller 2 or independent therefrom. These horizontal bars 11 can, to a greater or lesser extent, fit into the blocks 12; once these are adjusted, their length can be fixed by blocking screws 13. These horizontal bars 11 allow adjusting the distance of the filter 1 from the screen 4. The vertical bars 9 can be joined together by horizontal bars 10 and 14 which ensure a good positioning of the filter.

In the example shown in FIG. 4, the vertical bars 9 are curved so as to match the shape of the screen 4 so that the distance of the filter 1 from the screen 4 is identical at every point throughout.

Figure 7:
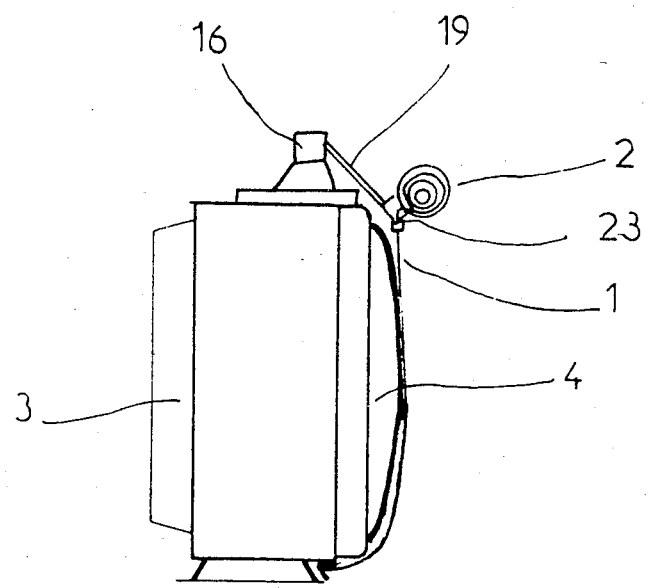
FIG. 7 is a sectional view of the screen and the filter whose automatic roller is not mounted but rather suspended in front of the screen.

FIGS. 5, 6, 7 show detailed views of means for clamping the roller which is no longer mounted on the screen but suspended in front of the highest (or the lowest) part of the screen, as well as means for guiding and adjusting the filter 1.

A rapid self-attaching coupling means 15 is disposed on top of the television set 3, opposite thereto a block 16 can also be fixed by means of a quick coupling means 17.

This block 16 comprises a recess 18 for the end 25 of the support bar 19. This support bar 19 can slide within the recess 18 so as to adjust the separating distance between the filter and the screen 4. A stop element 20 and a blocking screw 21 can hold and block the support bar 19.

A block 23 similar to the block 16 can be fixed to the other end 22 of the support bar 19. Instead of the stop element, an end 26 of the automatic roller 2 can be provided for, which is kept in place by a blocking screw 24.

A vertical bar 27 is fixed to the block 23, said bar allowing guiding the filter 1 and keeping it well tensioned in front of the screen 4 of the television set 3. This vertical bar 27 can be inserted in a hole 30 of the horizontal rod 28 disposed in the edge 29 of the filter 2.

Figure 8:
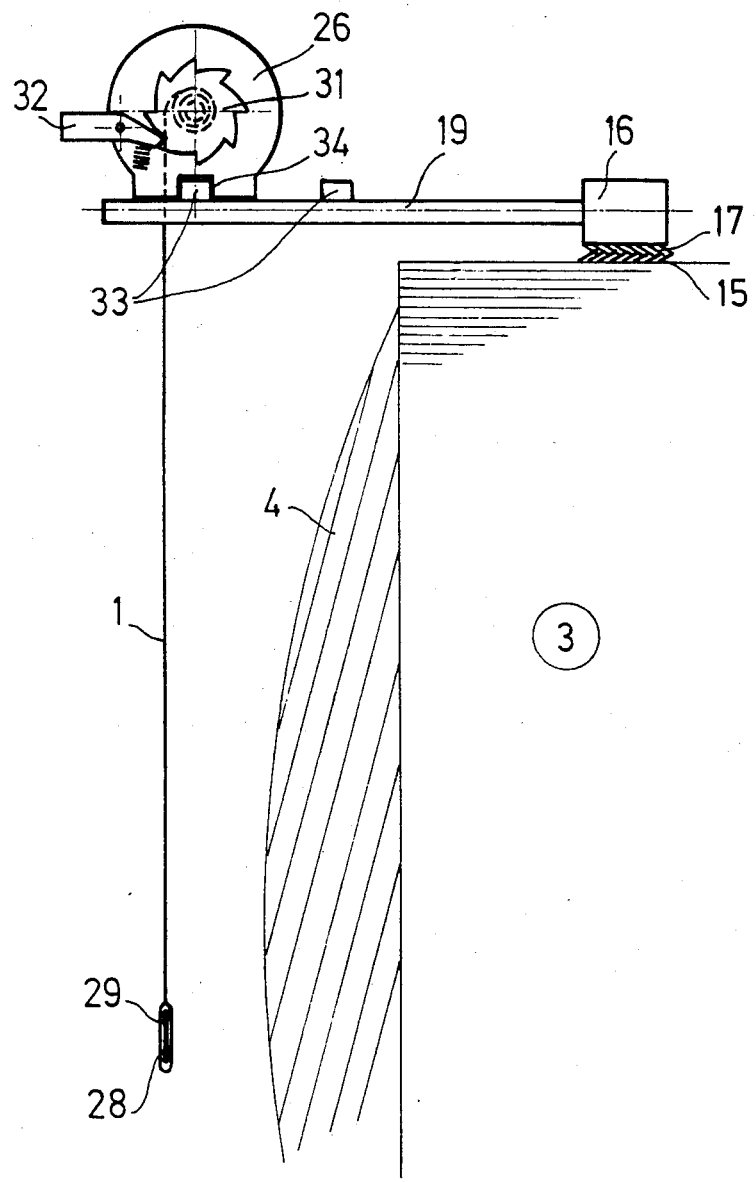
FIG. 8 is a sectional view of the device mounted in front of the television screen.

According to the embodiment shown in FIG. 8, once the filter 1 is unrolled, it hangs in front of the screen 4 of the television set 3 and is stretched by a sufficient weight of the bar 28 in the edge 29 and is positioned at a distance from the screen 4 by mounting the roller 2 on the support bars 19 provided with flanges 33 fitted in a suitable cavity 34 of the end 26, the support bars 19 constituting or not an integral part of the blocks 16 fixed to the television set 3 by the quick coupling means 17, 15 one of which is attached to the television set 3, the other to the block 16, the height of the unrolled portion of the filter 1 being controlled by the stopping caused by a ratchet wheel 31 and its blocking lever 32 against the action of the spring of the roller.

According to another embodiment, the device for positioning the filter in front of the screen is comprised by two L-shaped pieces 35 and 36. The horizontal leg of the L comprises a clamping means 37 for clamping on the apparatus. This means can be a quick coupling means 37 contacting a quick coupling means fixed to said apparatus 45. The vertical leg 36 of the L abutting the horizontal leg 36 of the L comprises an opening 38 which allows inserting one of the flanges 39 of the automatic roller 40 corresponding to the shape of the opening 38. The flange 39 of the automatic roller 40 is slidable along the entire length of the vertical leg of the L within a groove 41 provided for this purpose. Along this groove 41, on the external part thereof, there is a scale 42 in centimeters on each surface of one side.

According to another embodiment of the invention, the automatic roller 40 containing the filter 1 to be positioned in front of the cathode ray screen 43, is joined to the frame 44 of the apparatus 45.

The axle 40 can be extended by an element 46 having the shape of a stirrup. This stirrup 46 comprises an axle 47 perpendicular to the axle 40. A handle 48 is mounted on this axle 47. Therefore, the handle 48 mounted on its axle 47 can be pivoted both about the longitudinal axis of the axle 40 of the automatic roller and transversely to said axle 40. In the latter case, the handle 48 acts as a blocking means. In fact, the handle 48 is abutted against the frame or the first obstacle, preventing in this manner the axle 40 of the automatic roller from turning.

Figure 9:
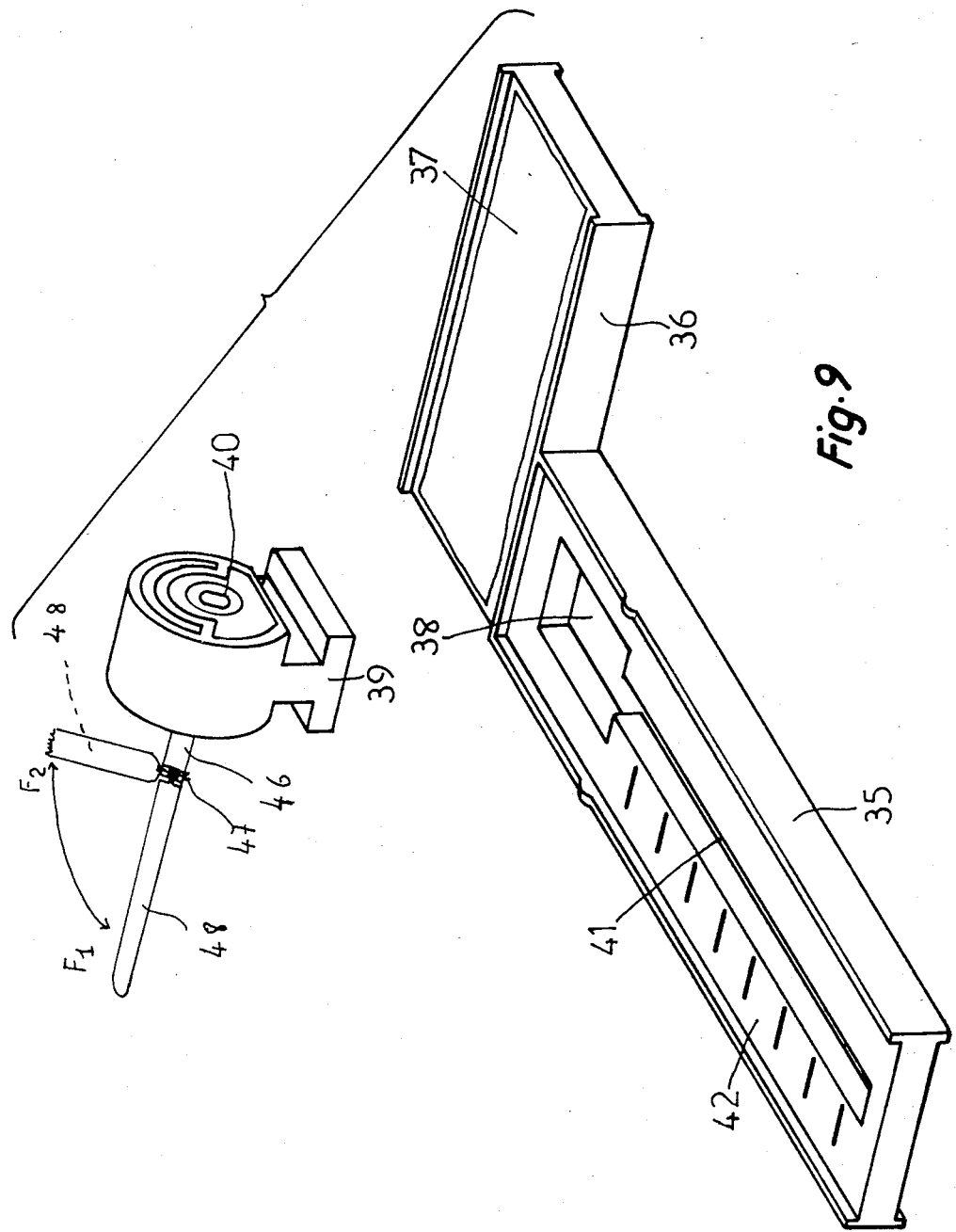
FIG. 9 is a perspective front view of the device and the automatic roller.
Figure 10:
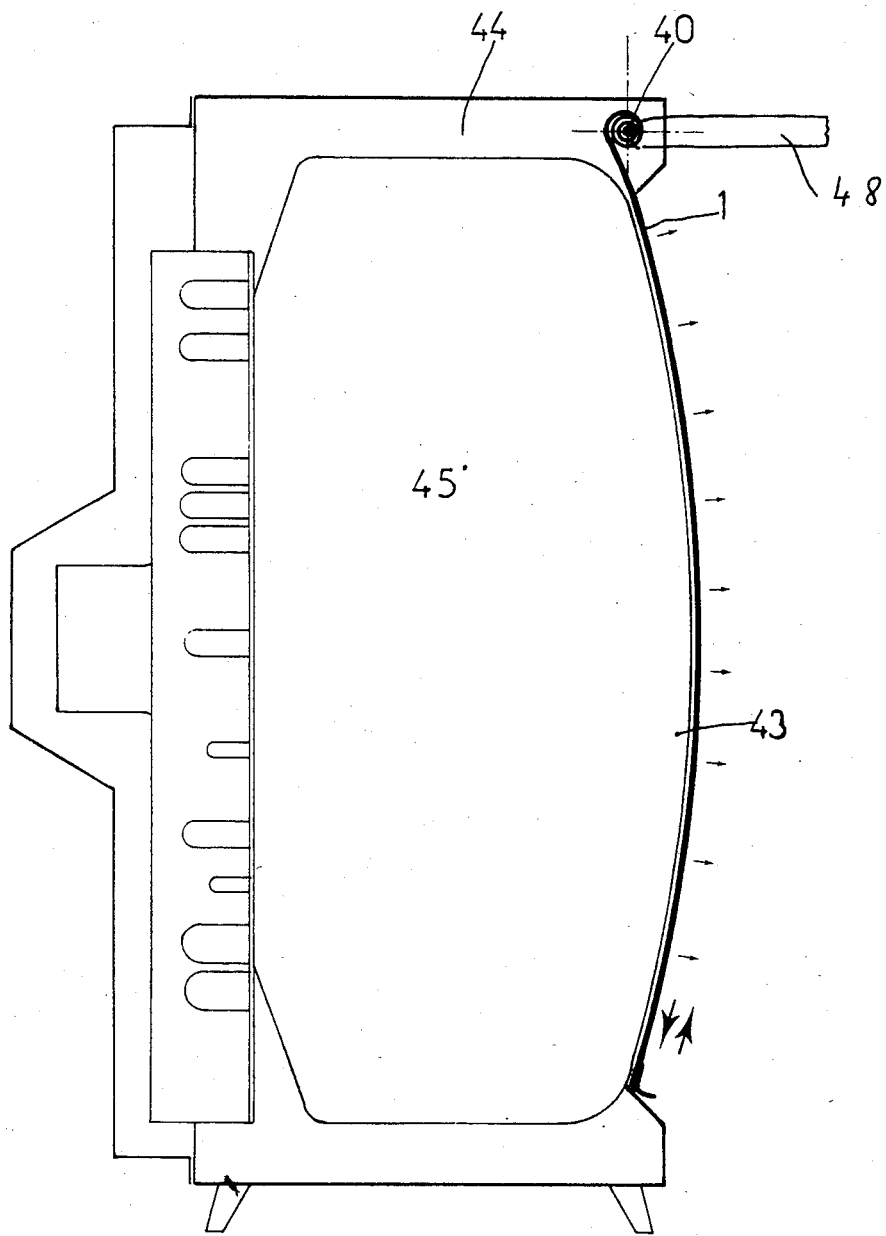
FIG. 10 is a sectional view of an apparatus having an integrated filter.
Figure 11:
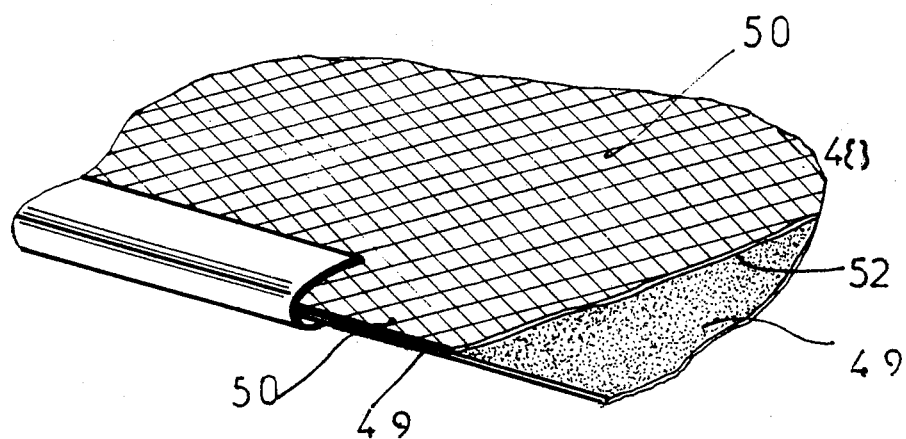
FIG. 11 is a schematic sectional view of the filter according to the invention.
Figure 12:
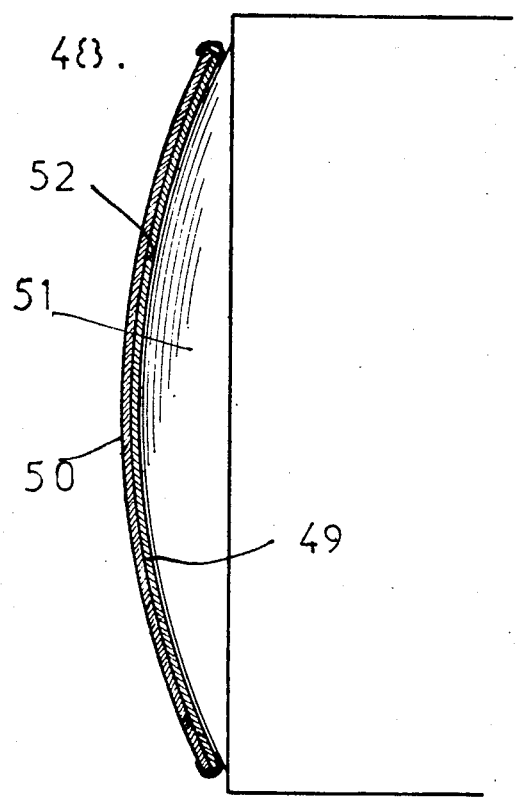
FIG. 12 is a schematic sectional view of the filter according to the invention and mounted on a cathode ray screen.
Figure 13:
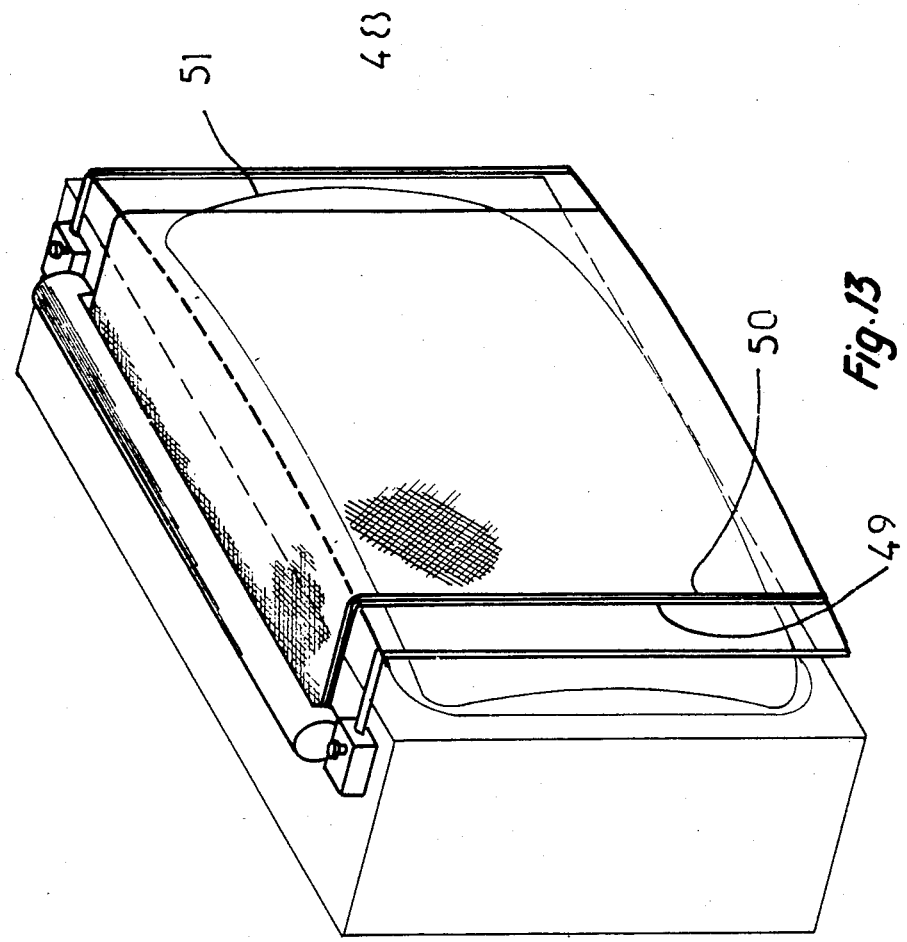
FIG. 13 is a schematic perspective view of the filter according to the invention, mounted on a cathode ray screen and unrolled from an automatic roller.
Figure 14:
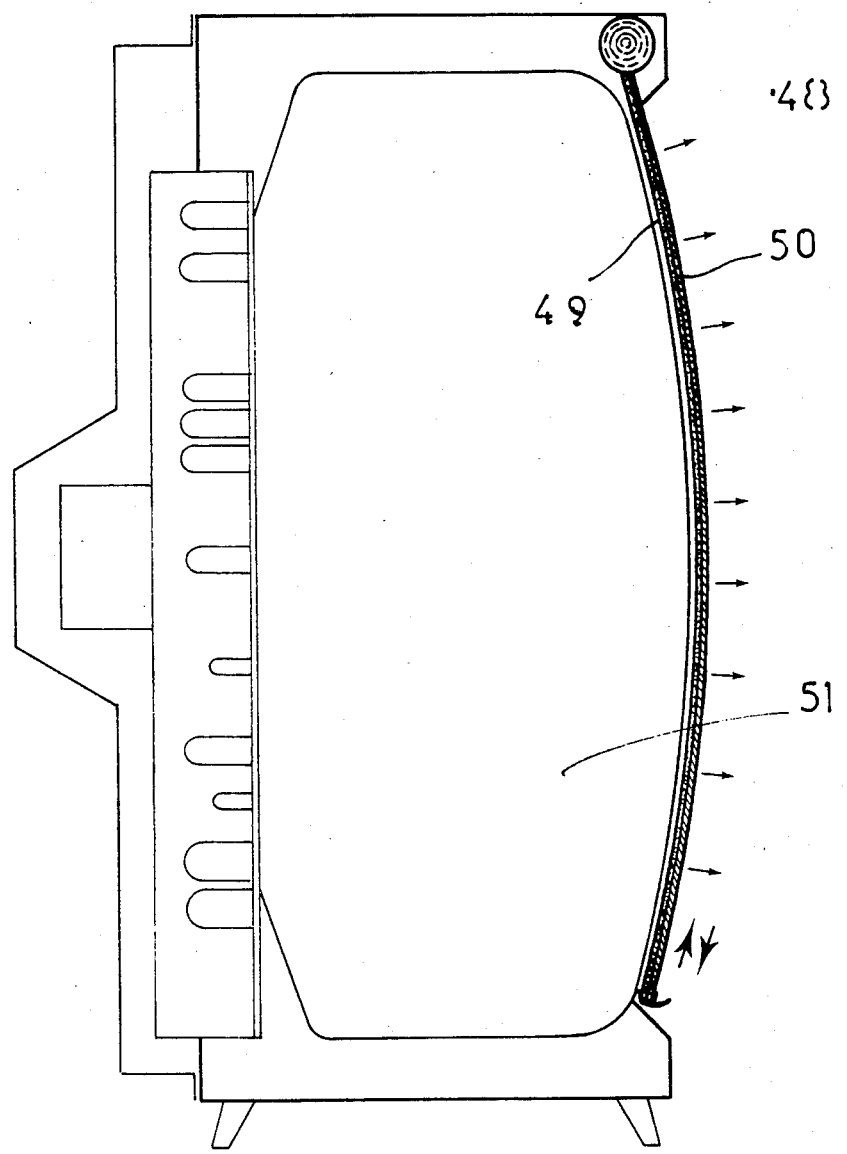
FIG. 14 is a schematic sectional view of the filter according to the invention and mounted on a cathode ray screen 51 and unrolled from an automatic roller.

To disengage the roller, it is sufficient to reposition the handle 48 in prolongation of the axle 40 as shown by the arrows F1 and F2 in FIG. 9. A translucent film 49 is disposed against one of the surfaces of the filter 1. Said translucent film 49 can for example be a film 49 or a sheet made of translucent plastic (see FIGS. 11, 12 and 13).

This plastic film 49 can be rigid, semi-rigid or flexible, and the "micromesh fabric" 50 can be welded thereto by rolling in a heated state, calendered, or simply fixed thereto by means of fastening means.

This plastic film 2 performs two functions:
(1) A mechanical function,
(2) An optical function.

This plastic film 49 facilitates the handling of the filter 48 which has a greater firmness and it improves the optical qualities.

Thus, it acts as a correcting means due to its molecular orientation. It avoids the undesired interferences (watered effects in the form of fringes, crosses and other circles). When suitably chosen, the translucent material can substantially diminish the polarizing-analyzing effect arising between the cathode ray tube and the screen filter 1.

The filter 48 is positioned in front of the cathode ray screen, with its surface comprising the translucent plastic film 49 facing the screen, the other woven surface 50, without the translucent plastic screen 49, is positioned towards the user.

What is claimed is:

1. Device for positioning an automatically removable filter in front of a cathode ray screen, when it is lit up, comprised by a sheet of a textile material woven with micromeshes, comprising an automatic roller (2), securement means (5) (15) for said roller to a television set (3), guiding and holding means (8, 9, 27, 28) for the filter (1), and securement means (7A, 7B, 30) for the filter (1) either by its end (6) or by its sides.

2. Device according to claim 1, characterized in that the automatic roller (2), which contains said filter for cathode ray screen, is fixed to the television set (3) by its upper or lower part or laterally, so that the filter (1), once it is unrolled, is positioned very close in front of the screen (4).

3. Device according to claim 1, characterized in that the automatic roller (2) comprising said filter for cathode ray screen, is suspended in front of the screen (4) of the television set (3) by support bars (19).

4. Device according to claim 1, characterized in that the guiding and holding means of the filter (1) are horizontal bars (11) and vertical bars (9) allowing adjusting and guiding the filter (1) with respect to the screen (4).

5. Device according to claim 1, characterized in that the securement means (7A, 7B, 30) for the filter (1) by its end (6) are quick coupling means (7A, 7V); hook-and-eye pads (7A) are attached to the television set (3), while an end (6) of the filter (1) comprises hook-and-eye pads (7B) facing the pads (7A) and corresponding thereto.

6. Device according to claim 1 characterized in that it can comprise lateral coupling means (8) which are quick coupling means.

7. Device according to claim 1 characterized in that it comprises guiding means (9, 11), such as horizontal bars (11) and vertical bars (9) allowing adjusting and guiding the position of the filter (1) with respect to the screen (4); the horizontal bars (11) are fitted in blocks (12) provided for this purpose which are joined to an integral part of the roller (2) or independent therefrom, these horizontal bars (11) can be inserted, to a greater or lesser extent, in the blocks (12); once these bars (11) are adjusted, their length can be fixed by blocking screws (13).

8. Device according to claim 1, characterized in that the vertical bars (9) can be joined together by means of horizontal bars (10, 14) which ensure a good positioning of the filter (1).

9. Device according to claim 1, characterized in that the bars (9) can be curved so as to match better the shape of the screen (4).

10. Device according to claim 1 characterized in that a rapid self-attaching coupling means (15) is disposed on top of the television set (3), opposite thereto a block (16) is also fixed by a quick coupling means (17), this block (16) comprising a recess (18) for the end (25) of the support bar (19); this support bar (19) can slide within the recess (18) so as to be able to adjust the distance between the filter and the screen (4), a stopping element (20) and a blocking screw (21) can hold and block the support bar (19); a block (23) similar to the block (16) can be fixed to the other end (22) of the support bar (19); it is possible to use, instead of the stopping element, an end (26) of the automatic roller (2), said end (26) being held in position by a blocking screw (24); a vertical bar (27) is fixed on the block (23), said bar (27) allowing guiding the filter (1) and keeping it well stretched in front of the screen (4) of the television set (3), this vertical bar (27) can be inserted in a hole (30) of the horizontal rod (28) disposed in the edge (29) of the filter (1).

11. Device according to claim 1, characterized in that when the filter (1) is unrolled, it hangs vertically in front of the screen (4) of the television set (3), and is stretched by a sufficient weight of the bar (28) in the edge (29) at a suitable distance from the screen (4) by positioning the roller (2) on the support bars (19) provided with flanges (33) fitted in a suitable cavity (34) in the end (26), the support bars (19) being joined or not joined to the block (16) fixed to the television set (3) by means of quick coupling means (17, 15) one of which is attached to the television set (3), the other to the block (16), the height of the unrolled portion of the filter (1) being controlled by the stopping caused by a ratchet wheel (31) and its blocking lever (32) against the action of the spring of the roller (2).

12. Device for positioning a filter serving as a grate or screen mounted on an automatic roller to be disposed in front of a cathode ray screen according to claim 1, characterized in that the device is comprised by two L-shaped elements (35 and 36); the horizontal leg (36) of the L comprises a clamping means (37) for clamping on the apparatus (45); this means can be quick coupling means (37) contacting a quick coupling means attached to said apparatus (45); the vertical leg (35) of the L abutting the horizontal leg (36) of the L has an opening (38) which allows inserting one of the flanges (39) of the automatic roller (40) corresponding to this shape of the opening (38), the flange (39) of the automatic roller (40) can slide along the entire length of the vertical leg of the L within a groove (41) provided for this purpose; along this groove, on the external part thereof, there is a scale (42) in centimeters on each face of one side.

13. Device according to claim 12 characterized by the fact that the automatic roller (40) comprising the filter (1) to be positioned in front of the cathode ray screen (43) is secured to the frame (44) of the apparatus (45).

14. Device according to claim 12 characterized in that a blocking means (48) allows blocking the rotation of the axle (40) of the automatic roller.

15. Device according to claim 12 characterized in that the blocking means (48) is a handle mounted on a stirrup (46) comprising an axle perpendicular to the axle (40) of the automatic roller, the handle (48) perpendicularly disposed to the axle (40) of the roller, is butted against the first obstacle thereby preventing said axle (40) from rotating.

* * * * *